United States Patent [19]

Gaudin

[11] Patent Number: 4,845,330
[45] Date of Patent: Jul. 4, 1989

[54] ROTARY-ELECTRODE INERT-GAS ARC WELDING MACHINE

[75] Inventor: Jean P. Gaudin, Chassieu, France

[73] Assignee: Framatome, Courbevoie, France

[21] Appl. No.: 64,370

[22] Filed: Jun. 22, 1987

[30] Foreign Application Priority Data

Jun. 23, 1986 [FR] France ............... 86 09030

[51] Int. Cl.⁴ .............................. B23K 9/02
[52] U.S. Cl. ................... 219/60 A; 219/60.2
[58] Field of Search ............... 219/60.2, 60 A, 60 R, 219/124.33, 124.34

[56] References Cited

U.S. PATENT DOCUMENTS 3,777,110 12/1973 Yohn et al. ............... 219/60 A
4,072,828 2/1978 Thome ...................... 219/137.31
4,571,475 2/1986 Rabe .......................... 219/60 A

FOREIGN PATENT DOCUMENTS 0068952 1/1983 European Pat. Off.
7737333 12/1977 France.
1482741 8/1977 United Kingdom.

Primary Examiner—E. A. Goldberg
Assistant Examiner—L. Donovan
Attorney, Agent, or Firm—Pollock, Vande Sande & Priddy

[57] ABSTRACT

The outer shell of the linking housing (7) of the welding machine consists of a first casing (7a) and a second casing (7b), assembled together through a flat surface (44). The electrode support (10) is mounted to move in rotation in a bearing (30) fixed in the first casing (7a) about an axis of rotation (42). The shaft (40) for transmission of the rotation to the electrode support (10) is mounted to move in rotation in a bearing (28) fixed in the second casing (7b) about an axis of rotation (43). The axes (42) and (43) converge at a point 0 on the surface (44) and form an angle with the axis normal to the surface (44) at 0. The disalignment of the axes (42) and (43) can be adjusted by rotating the casings (7a, 7b) with respect to each other.

7 Claims, 2 Drawing Sheets

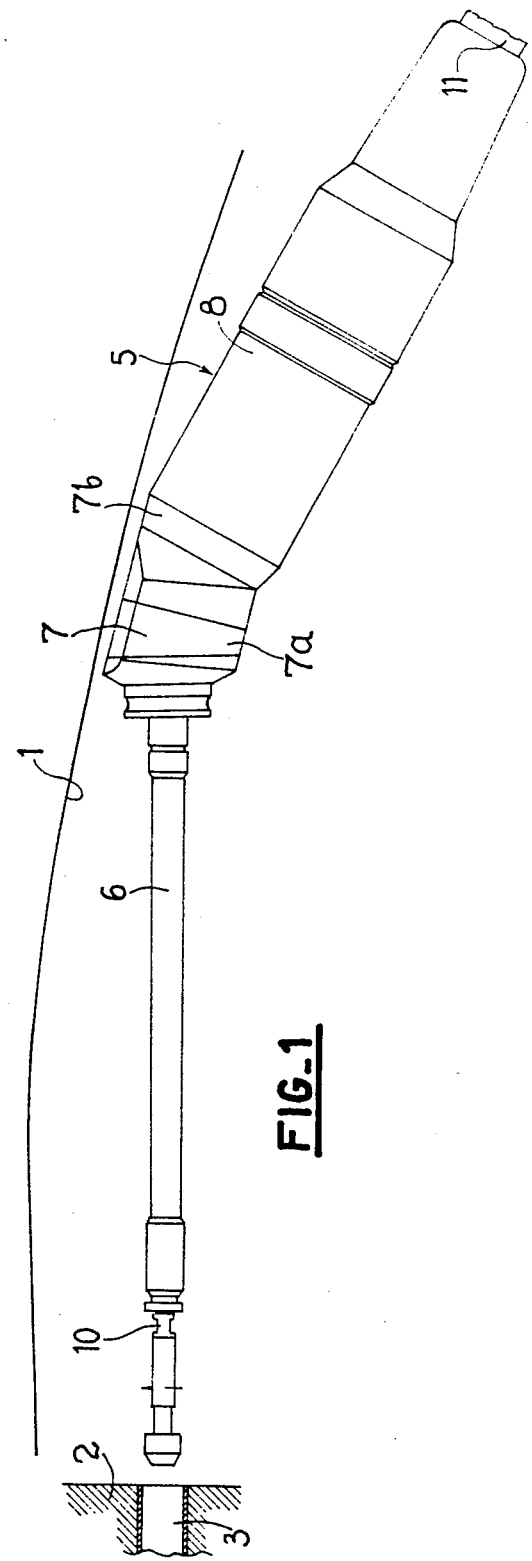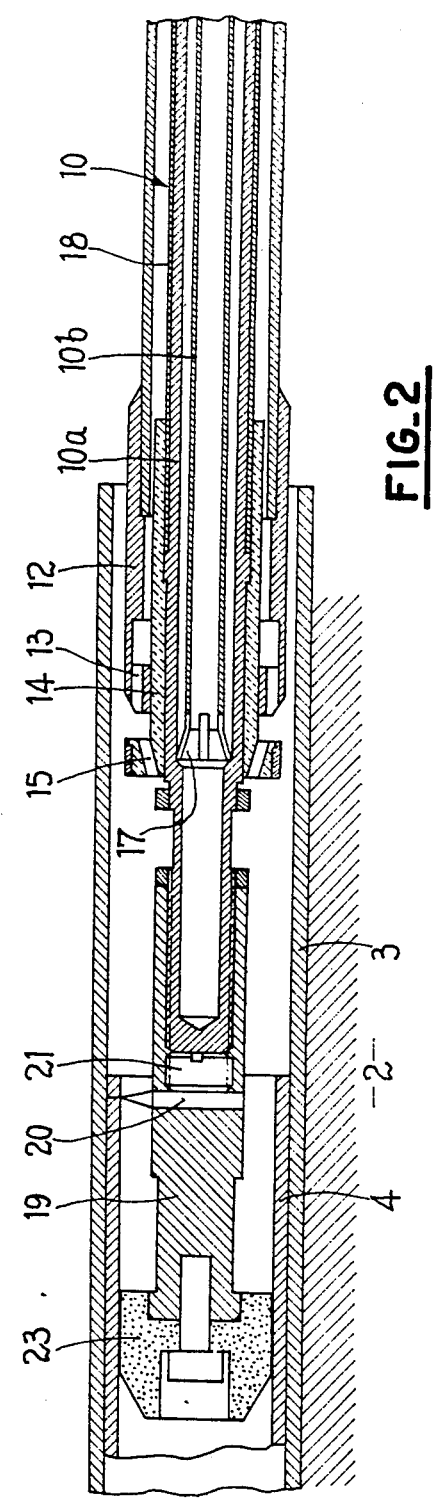

ROTARY-ELECTRODE INERT-GAS ARC WELDING MACHINE

FIELD OF THE INVENTION

The invention relates to a rotary-electrode inert-gas arc welding machine for the orbital internal welding of cylindrical parts which are accessible only with difficulty. The invention is applied especially to the welding of the end of a linning sleeve, inside a peripheral tube of a steam generator of a pressurized water nuclear reactor.

BACKGROUND OF THE INVENTION

The steam generators of pressurized water nuclear reactors contain a tube bundle, the ends of the tubes passing through a tube plate and opening into a water box of hemispherical shape which provides for the distribution in the tubes of pressurized water coming from the reactor vessel, and the recovery of the pressurized water which has circulated through the tubes of the bundle.

During the operation of the steam generator, some of the tubes of the bundle can be caused to crack, through the effect of mechanical or thermal stresses or through the effect of corrosion. To remedy this deterioration of the tubes, processes and devices have been proposed, whereby the tubes may be lined with a sleeve introduced into the tube in the cracked region, and fixed to the inner wall of the tube in a resistant and leakproof manner.

It may be necessary to complete the lining by welding one of the ends of the sleeve to the tube. This welding operation is carried out with an orbital type inert-gas arc welding machine containing a tungsten electrode attached to a tubular support which is introduced into the tube and the sleeve so as to present the electrode in the desired region, the electrode being rotated about an axis coincident with the axis of the tube.

Such a welding machine, which is operated from the water box of the steam generator, contains a welding sheath through which the tubular support for the electrode passes, and which can be introduced into the tube to perform the welding of the sleeve. The welding machine also contains a motorization and fluid distribution assembly, for roating the tubular support for the electrode and for supplying it with cooling water, as well as for supplying the welding region with inert gas.

Between the welding sheath and the motorization and distribution assembly, there is interposed a linking housing through which passes a transmission shaft connected to the motorization device, enabling the electrode support to be driven in rotation, and through which pass various channels for the circulation of fluids. The linking housing also enables a conductor to be passed through, for supplying the electrode with electric current.

The welding machine assembly, comprising the sheath, the linking housing and the means of motorization and distribution, is of considerable length, so that sufficient clearance must be provided inside the water box.

For the tubes of the steam generator situated in the central portion of the bundle, the height of the water box is amply sufficient to permit the welding machine to be moved in a direction perpendicular to the tubes. In contrast, as regards the peripheral tubes, the free height perpendicular to these tubes, up to the hemispherical wall of the water box, can be altogether insufficient to permit the insertion of the electrode support and the sheath into the tube and for carrying out the orbital welding of the end of a corresponding repair sleeve.

A machine or equipment which made it possible to weld the end of a sleeve in a peripheral tube of the steam generator was not known to date.

SUMMARY OF THE INVENTION

The object of the invention is hence to provide a rotary-electrode inert-gas arc welding machine for the orbital internal welding of cylindrical parts which are accessible only with difficulty, comprising, in a known manner, a welding sheath through which the tubular support for the electrode passes, a motorization and fluid distribution assembly and a linking housing between the welding sheath and the motorization and distribution assembly comprising a hollow outer shell electrically insulated on its inner surface, via which housing the electrode is rotated and supplied with electric current and through which housing the inert gas and the cooling water pass, this welding machine permitting adaptation so that it can be introduced into cylindrical parts which are accessible only with difficulty, such as peripheral tubes of a steam generator.

To this end, the outer shell of the linking housing is composed of two successive parts between the welding sheath and the motorization assembly, consisting respectively of:

(1) a first casing, inside which is fixed a first bearing which receives the end of the tubular support for the electrode, and (2) a second casing, inside which is fixed a second bearing which receives a transmission shaft connected to a means of rotating the electrode.

The first and the second casing each incorporate a flat face which is in contact with the corresponding face of the other casing to form a common assembly and sliding surface, the axis normal to which surface forms an acute angle $\alpha$, which is not zero, with the axis of the first bearing and with the axis of the second bearing which intersect on the common assembly surface, the two casings being assembled so as to be able to rotate with respect to each other about the axis normal to the common surface passing through the point of intersection of the two axes, between different angular positions in which means enable the two casings to be firmly united, the axes of the bearings in the casings thereby forming a variable angle between 0 and $2\alpha$.

BRIEF DESCRIPTION OF THE DRAWINGS

In order that the invention may be more clearly understood, an embodiment of a welding machine according to the invention, and its use for welding a sleeve in a steam generator tube, will now be described by way of example with reference to the accompanying drawings.

FIG. 1 is a side view of the welding machine in the working position in the water box of a steam generator.

FIG. 2 is a sectional view through a vertical plane of symmetry of the upper portion of the welding machine shown in FIG. 1.

FIG. 1 shows a portion of the spherically shaped internal surface 1 of the water box of a steam generator, limited at its top by the lower face of a tube plate 2 through which passes a tube 3 only the lower portion of which is shown. The tube 3 is in the process of being lined, a sleeve 4 (visible in FIG. 2) having been introduced into the tube and fixed against its inner wall.

Figure 3:
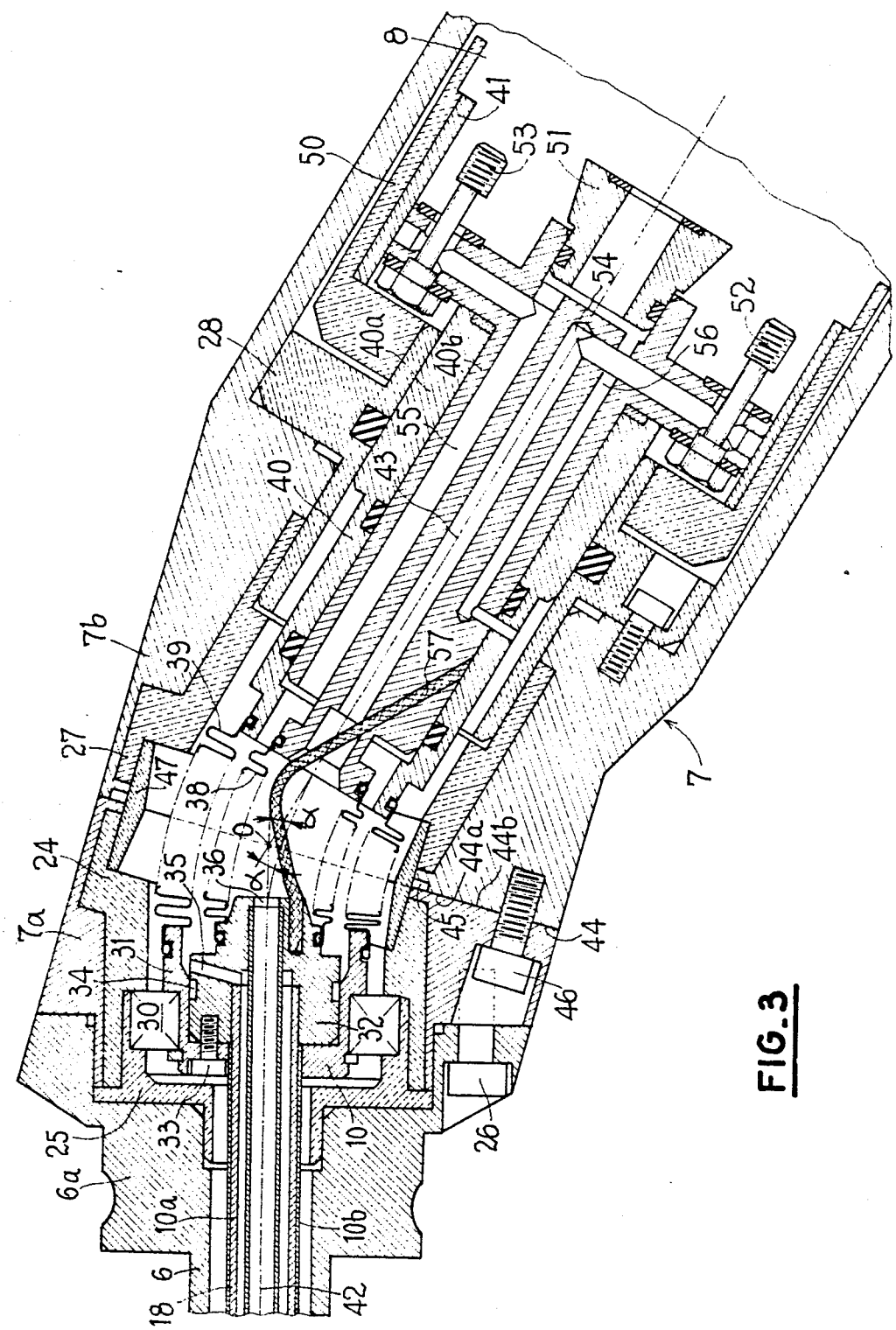
FIG. 3 is a partial sectional view through a vertical plane of symmetry of the lower portion of the welding machine shown in FIG. 1. cl DESCRIPTION OF PREFERRED EMBODIMENT

The lining operation comprises a final phase of welding the lower end of the sleeve 4 to the internal surface of the tube 3, to seal, in a completely leakproof manner, the void which may exist between the sleeve and the tube. When the steam generator is brought into operation again, any introduction of pressurized water into the void which communicates with the crack passing through the tube 3, which crack necessitated the lining, is thereby avoided.

This operation of welding the sleeve is carried out, according to the invention, using a welding machine 5, shown in FIG. 1.

This welding machine 5 enables the shape of the internal wall 1 of the water box to be matched as far as possible, and enables welding to be carried out in a tube 3 situated at the periphery of the bundle of the steam generator.

The welding machine 5 comprises a sheath 6 through which the electrode support 10 passes, a two part linking housing, and a motorization and fluid distribution assembly 8 connected to a flexible pipe 11 through which pass electrical supply cables and pipes for supplying inert gas and water.

The casing of the assembly 8 contains, in particular, the electric motor which enables the welding electrode to be rotated, the assembly for distribution of inert gas and cooling water and also the electric current lead supplying the welding electrode.

The portion 7a of the linking housing 7, constituting a first casing as will be described below, is rigidly united to the welding sheath 6.

The second portion of the linking housing, constituting a second casing 7b, is rigidly united to the casing of the assembly 8. In the embodiment which will be described with reference to FIG. 3, the casing 7b is made integrally with the casing of the assembly 8.

The welding machine 5 is supplied with electricity and fluid from a work station situated outside the water box, the pipe 11 containing the electric supply cables and the fluid tubes passing through a manhole in the water box.

The welding machine 5 shown in FIG. 1 can be used by an operator working inside the water box, or can be associated with a handling device controlled from outside the water box and enabling the welding machine to be positioned perpendicular to the tube in which the welding is carried out and to be introduced up to the instant when the welding electrode is in its working region.

In FIG. 1, the welding machine has been shown before the introduction of the sheath into the tube 3.

In FIG. 2, the end of the sheath 6 has been shown introduced into the tube 3, its upper part incorporating the electrode being itself inside the lining sleeve 4.

The sheath 6, made in tubular form, is firmly united, at its upper end, to a centering collar 12 pierced at its end with channels 13 communicating with the inner bore of the collar 12. The tubular support 10 for the electrode is mounted inside the sheath 6, coaxially with the latter, a centering bearing 14 made of an electrically insulating material being interposed. The bearing 14 constitutes, in its upper part, a boss which is drilled with channels 15.

The electrode support 10 consists of two firmly united and coaxially mounted tubes 10a and 10b, the inner tube 10b terminating at its top in a distributor 17 which enables the circulation of water to be provided in the upper portion of the electrode support. The outer tube 10a is lined, in its portion situated inside the sheath 6, with a layer of electrically insulating material 18, especially in its portion situated outside the insulating centering bearing 14.

The outer tube 10a of the electrode support 10 is closed at its upper end and incorporates a terminal portion which projects with respect to the welding sheath 6 and which is fixed by screwing into an electrode support extension piece 19. The tungsten electrode 20 is fixed by means of a screw 21 in a housing in the extension piece 19 provided in a direction radial to this extension piece.

The support extension piece 19 carries at its upper end a ceramic plug 23, the external diameter of which is very slightly less than the internal diameter of the sleeve 4.

The tubular electrode support 10 is mounted to rotate about its axis, inside the sheath 6, by virtue of the centring bearing 14 mounted free and inserted between the centring sleeve 12 of the sheath 6 and the outer tube 10a of the tubular support 10.

By rotating the tubular support 10 about its axis, a circumferential region of very small width may be swept by the arc which is formed between the end of the tungsten electrode 20 and the internal surface of the sleeve 4 when the electric current is supplied at a sufficient voltage to the electrode 20. The welding is produced by local melting of the sleeve 4 and of the tube 3.

FIG. 3 shows the linking housing 7 in two portions 7a and 7b, the portion 7a constituting a tubular-shaped casing lined internally with parts made of electrically insulating material 24 and 25.

The casing 7a is attached by screws such as 26 to a base 6a firmly united to the bottom of the welding sheath 6. The base 6a also constitutes a closing cap for the upper portion of the housing 7a, providing with the later for the fixing of the insulating parts of internal lining 24 and 25.

The second portion 7b of the linking housing 7 is also in the shape of a tubular casing, this casing 7b being integral with the housing of the motorization assembly 8. The housing 7b is also lined internally with electrically insulating parts 27 and 28.

A bearing 30 is inserted between the insulating parts 24 and 25 of the first casing 7a, consisting of a bearing whose outer ring is fixed by clamping between the insulating parts 24 and 25. The inner ring of the bearing 30 is firmly united to a sleeve 31, in the inner bore of which is fixed a part 32 by means of screws such as 33. A gasket 34 enables a leakproof joint to be made between the parts 31 and 32.

The lower end of the tubular electrode support 10 is rigidly fixed into the part 32, with the result that the assembly consisting of the parts 31, 32 and the tubular support 10 is mounted to rotate about the axis of the bearing 30, which is coincident with the axis of the tubular support 10 and of the tube 3 being lined. The part 32 is drilled with one or more channels 35, bringing the annular space included between the tubes 10a and 10b into communication with a space included between the parts 31 and 32 and situated below these parts. The part 32 is also drilled with a hole 36 in the extension of the tube 10b, bringing the inside of this tube into communication with the space situated under the part 32.

A metal bellows 38 is fixed to the periphery of the bottom of the part 32 in a leakproof manner, and a metal bellows 39 is fixed, also in a leakproof manner, to the periphery of the bottom of the part 31.

The annular space between the tubes 10a and 10b of the tubular support 10 is hence brought into communication with the space situated between the bellows, while the internal space of the inner tube 10b is brought into communication with the inside of the bellows 38.

The insulating part 28 of the second casing 7b constitutes a smooth bearing for an assembly 40 which is movable in rotation inside the casing 7b and firmly united to an assembly 41 which is mounted to move in rotation in the casing of the assembly 8.

The movable assembly 41 is firmly united to the rotor of the electric motor which constitutes the device for motorization of the assembly 8.

The assembly 40 constitutes a shaft for transmission of the rotation of the motor to the electrode support 10, its top being connected to the bottom of the metal bellows 38 and 39. The axis 42 of the bearing 30, corresponding to the axis of the tubular support 10 and of the tube 3, and the axis 43 of the bearing 28, also corresponding to the axis of rotation of the driving motor, converge at a point 0 situated on the flat junction surface 44 between the casings 7a and 7b. The casings 7a and 7b incorporate, in effect, two flat terminal faces 44a and 44b, respectively, which come into plane-on-plane contact when the casing 7a is brought into position on the casing 7b. The flat surface 44 incorporates a very shallow cylindrical recess 45, enabling the casings 7a and 7b to be positioned perfectly and centered with respect to each other.

The casings 7a and 7b incorporate holes in corresponding positions, in which fixing screws such as 46 can be introduced in order to maintain the two portions of the casing in position.

Between the electrically insulating parts 24 and 27, there is also inserted an annular, electrically insulating part 47 arranged around the netal bellows 38 and 39.

The axis 42 of the bearing of the casing 7a and the axis 43 of the bearing 28 of the casing 7b both form an angle of 30° with the axis normal to the plane 44 at 0.

It is quite obvious that both half-casings can be oriented with respect to each other by rotating the first casing 7a about the axis normal to the plane 44 at 0, the movement being carried out by plane-on-plane sliding of the face 44a over the face 44b and by rotation of the cylindrical extension 45 of the casing 7a in the corresponding recess in the casing 7b.

It is thus possible to vary the disalignment of the axes 42 and 43 between 0 and 60°. During the relative rotation of the two casings, these axes are moved, in effect, over two conical surfaces having a common vertex 0 and a half-angle at the vertex of 30°.

In general, if the axes 42 and 43 form an angle $\alpha$ with the axis normal to the flat surface 44 at 0, the disalignment of the axes 42 and 43 may vary between the value zero and a value equal to $2\alpha$.

Depending on the position of the tube in which the final sleeving operation is to be carried out by means of the welding machine according to the invention, the disalignment of the two casings will be adjusted to a value which enables the welding sheath 6 to be introduced into the tube 3, as shown in FIG. 1.

The rotary assembly 40, mounted in the bearing 28 and constituting the shaft for transmission of the rotary movement to the electrode support, comprises two coaxial portions 40a and 40b mounted sealed to each other by means of sealing gaskets. The outer portin 40a is fixed to the outer bellows 39 at its top and the inner portion 40b to the inner bellows 38. The inner portion 40b is firmly united, at its bottom, with the rotary assembly 41 mounted in the casing 8 and firmly united to the motor. This assembly 41 incorporates, in particular, an insulating liner 50, a part for connection to the motor 51 and nozzles 52 and 53 which provide, respectively, for the admission of cooling water to the welding head and the return of this cooling water.

The connecting part 51 provides, in addition, for the admission of inert gas to the welding head. The distribution of water and inert gas is accomplished through the transmission shaft 40, which is drilled with suitable channels. The cooling water admission nozzle 52 is in communication with a central channel 54 in the part 40b which opens into the space bounded by the inner bellows 38 connecting with the electrode support.

The admission of water to the electrode support hence takes place through the inner tube 10b, the upper end of which is immediately below the electrode 20 and its fixing screw 21.

The water return nozzle 53 connects with a channel 55 drilled in the peripheral portion of the part 40b and opening between the bellows 38 and 39. The return of cooling water hence takes place through the space between the tubes 10a and 10b of the electrode support, which communicates with the space between the bellows 38 and 39.

In the upper portion of the electrode support, the cooling water passes, on its return, through the slits in the distribution part 17.

The inert gas, generally argon, is admitted through a central channel in the connecting part 51 which is fixed in a leakproof manner under the bottom of the portion 40b of the assembly 40. This channel is placed in communication, under the part 40b, with a channel 56 which opens at its top into the peripheral space around the transmission shaft 40 which is in communication with the space provided between the electrode support 10 and the welding sheath 6.

At the top of the welding sheath 6, the channels 13 and 15 enable the argon to be distributed in the welding region covered by the electrode 20. The ceramic plug 23 enables the upward passage of argon to be limited, only a very slight peripheral leak permitting the flow of the argon and the sweeping of the welding region.

The supply of argon and of water to the channel in the part 51 and to the nozzles 52 and 53, respectively, is carried out at the rotor of the motor (not shown) inside the casing 8.

The input of the electric welding current also takes place through the transmission shaft 40, which is connected through a conductor of large cross-section 57 to the part 32 firmly united with the electrode support 10.

The rotating assembly fixed inside the casings 8, 7b and 7a and inside the welding sheath 6, the electric welding current travelling through this assembly, is surrounded over its entire length by insulating parts 50, 28, 27, 47, 24, 25 and by the insulating layer 18. No arcing can hence take place between the movable assembly and the casing of the welding machine.

The rotary motion can be transmitted from the assembly 41 and the transmission shaft 40 to the electrode support 10 despite the disalignment of the axes 43 and 42, by virtue of the bellows 38 and 39 which are capable of bending.

To use the welding machine according to the invention in a peripheral tube of a steam generator, the requisite orientation between the housings 7a and 7b for gaining access to this tube.i.e., for presenting the welding sheath 6 in a vertical position in the extension of the axis of the tube, is predetermined. This chosen orientation is achieved by rotating the housing 7a with respect to the housing 7b about the normal axis at 0, and the two housings are then fixed with respect to each other by means of the screws 46.

The welding machine is then introduced into the water box of the steam generator and positioned perpendicular to the tube, and the welding sheath is then introduced to the desired height in the tube.

The desired supplies of fluid and electric current and the rotation of the electrode are controlled from outside the water box. The welding operation is thus carried out without difficulty, even as regards the peripheral tubes.

It is possible to envisage casings in which the axes of the bearings form an angle other than 30° with the axis normal to their common flat assembly and sliding surface. This angle will be determined by the geometrical conditions limiting the accessibility of the tubes or other cylindrical parts inside which the welding is performed.

The distribution of the fluids can be carried out in another manner, and the same applies to the transmission of the rotation to the electrode support and the supply of electric current.

Finally, the invention is not limited to a welding machine used for lining steam generator tubes, but can also be applied to any machine for orbital welding of hollow cylindrical parts which are accessible only with difficulty.

What is claimed is:

1. Rotary-electrode inert-gas arc welding machine for orbital internal welding of hollow cylindrical parts which are accessible only with difficulty, comprising a welding sheath (6) through which a tubular support (10) for an electrode (20) passes, an assembly having motor and fluid distribution means (8) and a linking housing (7) comprising a hollow outer shell electrically insulated on its inner surface between the welding sheath (6) and the assembly (8), via which housing the electrode (20) is rotated and supplied with electric current and through which housing an inert gas and cooling water pass, wherein the linking housing (7) comprises an outer shell composed of two successive parts (7a, 7b) between the welding sheath (6) and the assembly (8), a first part of the two successive parts consisting of a first casing (7a), inside which is fixed a first bearing (30) which receives the end of the tubular support (10) for the electrode (20), a second part of the two successive parts consisting of a second casing (7b), inside which is fixed a second bearing (28) which receives a transmission shaft (40) connected to a means of rotating the electrode (20), the first casing and the second casing (7a, 7b) each incorporating a flat face (44a, 44b) which is in contact with a corresponding flat face of the other casing to form a common assembly and sliding surface (44), the axis normal to which surface forms an acute angle $\alpha$, other than zero, with the axis (42) of the first bearing (30) and with the axis (43) of the second bearing (28) which intersect on the common assembly and sliding surface (44), the first and second casings (7a, 7b) being assembled for rotation with respect to each other about the axis normal to the common surface (44) passing through the point of intersection 0 of the two axes (42) and (43), between different angular positions in which means (46) enable the first and second casings (7a, 7b) to be firmly united, the axes (42, 43) of the bearings (30, 28) in the first and second casings thereby being variable between 0° and 20°.

2. Welding machine according to claim 1, wherein the transmission shaft (40) is connected at one of its ends to the motor assembly (41) and at its other end to the electrode support (10) via at least one bellows (38, 39) enabling a rotational movement to be transmitted to the electrode support (10) and to the electrode (20), in spite of the angle between the axes (42, 43) of the first and second bearings in the casings (7a, 7b), by virtue of a bending of the bellows (38, 39).

3. Welding machine according to claim 2, wherein the transmission shaft (40) is connected to the electrode support (10) by two coaxial bellows (38, 39) arranged one inside the other, the internal space of the inner bellows being in communication with a water supply pipe (10b) for the tubular electrode support (10) and with a cooling water supply channel (54) provided in the transmission (40), and the annular space between the bellows (38) and (39) being in communication with a water return pipe in the tubular support (10) for the electrode (20) and with a water return channel (55) provided in the transmission shaft (40).

4. Welding machine according to claim 3, wherein the tubular electrode support (10) consists of two coaxial tubes (10a, 10b) mounted one inside the other.

5. Welding machine according to claim 4, wherein the inert gas passes through the first and second casings (7a, 7b) in the annular space included between their internal surface and the transmission shaft (40), the outer bellows (38) and electrode support (10), respectively, the transmission shaft (40) being drilled with a channel (56) which places a means of supplying argon (51) from the assembly (8) in communication with an internal space of the second casing (7b), at the periphery of the transmission shaft (40).

6. Welding machine according to claim 1, wherein the angle $\alpha$ formed by the axes (42, 43) of the bearings (30, 28) in the first and second casings (7a, 7b) with the axis normal to the flat assembly and sliding surface (44) is essentially equal to 30°.

7. Welding machine according to claim 1, wherein the hollow cylindrical parts in which the orbital internal welding is carried out are steam generator tubes in which lining is carried out with a sleeve (4), which is introduced into the tube (3) in which the lining is carried out and welded at its end to the tube (3).

* * * * *